United States Patent
Seier Christensen et al.

(10) Patent No.: US 6,746,624 B1
(45) Date of Patent: Jun. 8, 2004

(54) SYNTHESIS GAS PRODUCTION BY STEAM REFORMING USING CATALYZED HARDWARE

(75) Inventors: Peter Seier Christensen, Copenhagen NV (DK); Viggo Lucassen Hansen, Brønshøj (DK); J. R. Rostrup-Nielsen, Virum (DK)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 09/743,530

(22) PCT Filed: Jul. 1, 1999

(86) PCT No.: PCT/EP99/04562
§ 371 (c)(1),
(2), (4) Date: Mar. 29, 2001

(87) PCT Pub. No.: WO00/03579
PCT Pub. Date: Jan. 27, 2000

(30) Foreign Application Priority Data

Jul. 16, 1998 (DK) .......................... 1998 00948

(51) Int. Cl.$^7$ ............................................... C01B 3/26
(52) U.S. Cl. .................. 252/373; 423/652; 423/653; 423/654
(58) Field of Search .................... 252/373; 423/650, 423/651, 652, 653, 654

(56) References Cited

U.S. PATENT DOCUMENTS

| | | | | |
|---|---|---|---|---|
| 4,162,290 A | * | 7/1979 | Crawford et al. | 423/652 |
| 4,400,309 A | | 8/1983 | McMahon et al. | |
| 4,713,234 A | * | 12/1987 | Weirich et al. | 423/652 |
| 5,039,510 A | * | 8/1991 | Pinto | 423/652 |
| 5,300,275 A | * | 4/1994 | Lywood | 423/652 |
| 5,925,328 A | * | 7/1999 | Stahl et al. | 252/373 |
| 6,077,459 A | * | 6/2000 | Laursen et al. | 423/652 |
| 6,274,113 B1 | * | 8/2001 | Heyse et al. | 252/373 |
| 6,319,877 B1 | * | 11/2001 | Christensen et al. | 502/527.13 |
| 6,482,375 B1 | * | 11/2002 | van der Wal et al. | 423/652 |

FOREIGN PATENT DOCUMENTS

| | | |
|---|---|---|
| EP | 0 124 226 | 11/1984 |
| EP | 0 855 366 A1 | 7/1998 |
| GB | 2 034 597 A | 6/1980 |

OTHER PUBLICATIONS

Patent Abstract of Japan No. 06 064902, dated Mar. 8, 1994. Cited in the PCT search report.
Patent Abstract of Japan No. 05 096148, dated Apr. 20, 1993. Cited in the PCT search report.

* cited by examiner

*Primary Examiner*—Wayne A. Langel
(74) *Attorney, Agent, or Firm*—Armstrong, Kratz, Quintos, Hanson & Brooks, LLP

(57) ABSTRACT

Process for the preparation of hydrogen and carbon monoxide rich gas by catalytic steam reforming of a hydrocarbon feedstock comprising steps of: (a) optionally passing a process gas of hydrocarbon feedstock through a first reactor with a steam reforming catalyst heated by a hot gas stream; (b) passing the effluent from the first reactor to a subsequent tubular reactor containing a steam reforming catalyst and being heated by burning of fuel, thereby obtaining a hot gas stream of steam reformed product gas and a hot gas stream of flue gas; and wherein a reforming catalyst is placed on a metallic support having substantially the same shape as a wall of the reactor and being arranged in heat conduction relationship with the reactor wall.

7 Claims, 1 Drawing Sheet

SYNTHESIS GAS PRODUCTION BY STEAM REFORMING USING CATALYZED HARDWARE

Figure 1:
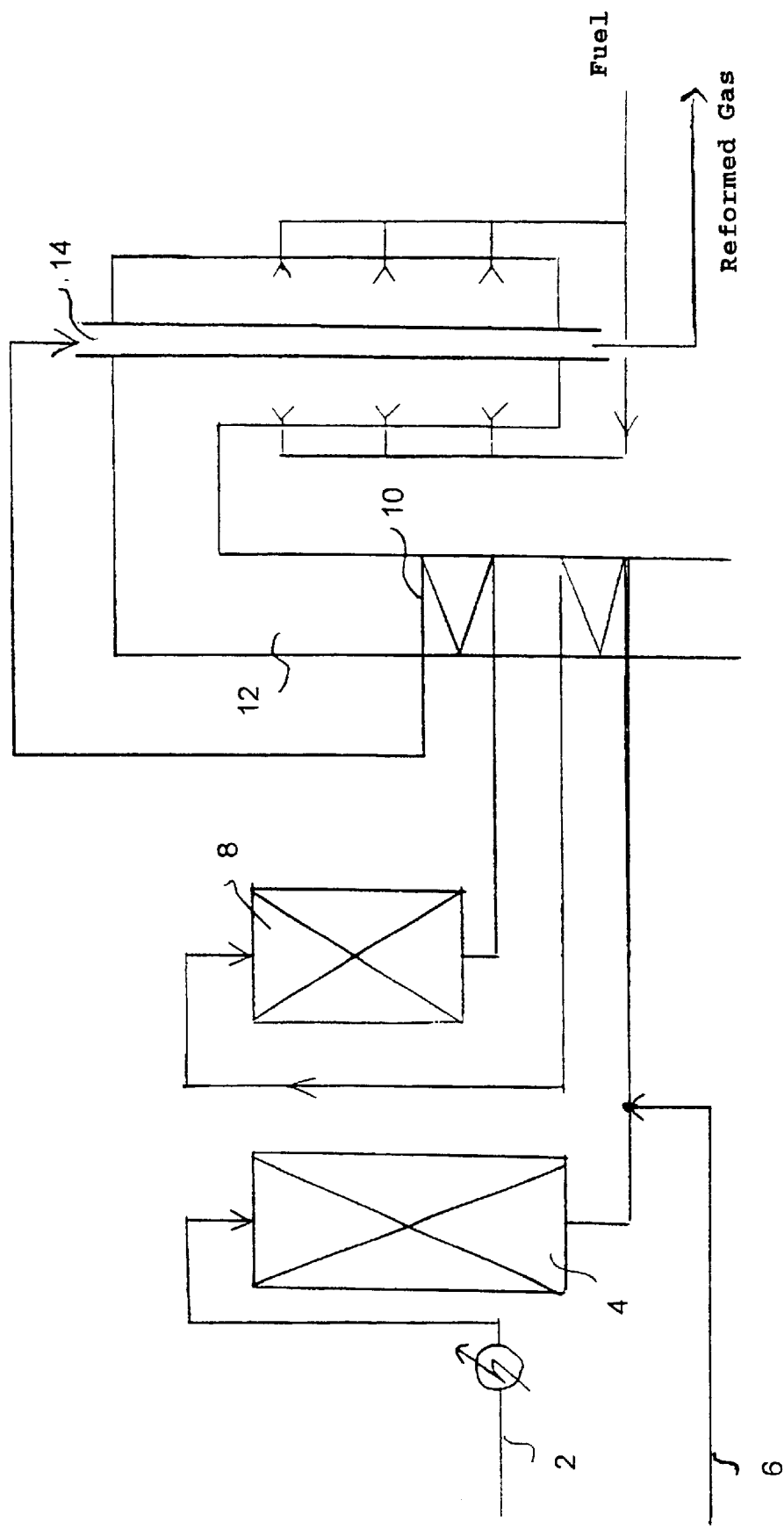

The present invention is directed to the production of synthesis gas by steam reforming of a hydrocarbon feedstock in contact with catalyzed hardware.

The term catalyzed hardware is used for a catalyst system where a layer of catalyst is fixed on a surface of another material, e.g. metallic surfaces. The other material serves as the supporting structure giving strength to the system. This allows to design catalyst shapes which would not have sufficient mechanical strength in itself.

Synthesis gas is produced from hydrocarbons by steam reforming by the reactions (1)–(3):

$$C_nH_m + nH_2O \rightarrow nCO + (n+m/2)H_2 \quad (-\Delta H_{298}^\circ < 0) \tag{1}$$

$$CO + H_2O \rightleftharpoons CO_2 + H_2 \quad (-\Delta H_{298}^\circ = 41 \text{ kJ/mole}) \tag{2}$$

$$CH_4 + H_2O \rightleftharpoons CO + 3H_2 \quad (-\Delta H_{298}^\circ = -206 \text{ kJ/mole}) \tag{3}$$

State of the art steam reforming technology makes use of reforming catalyst in the form of pellets of various sizes and shapes. The catalyst pellets are placed in fixed bed reactors (reformer tubes). The reforming reaction is endothermic. In conventional reformers, the necessary heat for the reaction is supplied from the environment outside the tubes usually by a combination of radiation and convection to the outer side of the reformer tube. The heat is transferred to the inner side of the tube by heat conduction through the tube wall and is transferred to the gas phase by convection. Finally, the heat is transferred from the gas phase to the catalyst pellet by convection. The catalyst temperature can be more than 100° C. lower than the inner tube wall temperature at the same axial position of the reformer tube.

It has been found that heat transport is more efficient when catalyzed hardware is used in the steam reforming process. The heat transport to the catalyst occurs by conduction from the inner tube wall. This is a much more efficient transport mechanism than the transport by convection via the gas phase. The result is that the temperatures of the inner tube wall and the catalyst are almost identical (the difference below 5° C.). Furthermore, the tube thickness can be reduced, see below, which makes the temperature difference between the inner and outer side of the reformer tube smaller. It is hence possible to have both a higher catalyst temperature and a lower tube temperature, all other conditions being the same when replacing the conventional reformer tubes with catalyzed hardware tubes. A low outer tube wall temperature is desirable since it prolongs the lifetime of the tube. A high catalyst temperature is advantageous since the reaction rate increases with temperature and since the equilibrium of reaction (3) is shifted to the right hand side resulting in a better utilisation of the feed.

Pressure drop in the catalyzed reformer tube is much lower than in the conventional case for the same tube diameter. This enables the use of reactor tubes with a smaller diameter and still maintaining an acceptable pressure drop. Smaller tube diameter results in an increased tube lifetime, tolerates higher temperatures and reduces the tube material consumption.

Finally, the catalyst amount is reduced when using catalyzed hardware reformer tubes compared to the conventional reformer with a fixed bed of reforming catalyst.

FIG. 1 shows the front-end of a plant producing syngas. Feed 2 is preheated, desulphurized in unit 4, mixed with process steam 6, and further heated before entering an adiabatic prereformer 8. The effluent stream from prereformer 8 is further heated in a heat exchanger coil, arranged in flue gas channel 12 and send to the tubular reformer 14, where conversion of methane to hydrogen, carbon monoxide, and carbon dioxide occurs. The processing of effluent gas downstream from the tubular reformer depends on the use of the product.

Catalyzed hardware can be used in two of the units shown in FIG. 1:

1. In the preheater coil 10 for heating the prereformer effluent gas before entering the tubular reformer 14.
2. In the tubular reformer 14.

The catalytic coating of a metal surface (wash-coating) is a well known process (a description is given in e.g. Cybulski, A., and Moulijn, J. A., Structured catalysts and reactors, Marcel Dekker, Inc., New York, 1998, Chapter 3, and references herein). A thin layer of a slurry containing the ceramic precursor is applied on the surface by means of e.g. spraying, painting or dipping. After applying for the coat, the slurry is dried and calcined at a temperature usually in the region of 350–1000° C. Finally, the ceramic layer is impregnated with the catalytic active material. Alternatively, the catalytic active material is applied for simultaneously with the ceramic precursor.

Unfortunately, a number of disadvantages of the catalyzed hardware reactors compared to fixed bed reactors exists:

The catalyst layer cannot be replaced if it looses its activity either by ageing or by poisoning.

The catalytic layer can only be applied to certain materials. The reactor tubes have to be made of this type of material which may be more expensive than a conventional tube material. The steam reforming reactions occurs under pressurized conditions and the tube thickness is large, hence the cost of materials influences the price significantly.

Furthermore, production of long catalyzed hardware reactor tubes can be difficult. The reactor tube can have a length of 10 m or more. It will be difficult to obtain an even thickness of the reforming catalyst layer throughout such a length, and means to obtain an even layer, which can be used for small scale application such as centrifuging the tube, is more difficult to apply for this size of tubes. Additionally, appropriate heat treatment of a tube of this size can be difficult.

These drawbacks can be overcome by producing the catalyzed hardware separately from the reactor as described below.

A metal support is cut into an appropriate size. The sheet is wash-coated as described above. After the wash-coating, the sheet is formed into the appropriate shape. Alternatively, the sheet is formed into the final shape prior to the wash-coating. The metallic support is formed substantially to have the same shape as the reactor wall and has been arranged in a direct heat conduction relationship with the reactor wall.

It will be possible to change the catalytic layer if it no longer has sufficient catalytic activity. The expensive steel used to obtain adhesion of the catalyst to the metal surface will only comprise a small fraction of the total metal consumption. The catalyzed hardware can be produced in smaller sections, which will be easier to manufacture and handle.

Accordingly, this invention provides a process for the preparation of hydrogen and carbon monoxide rich gas by catalytic steam reforming of a hydrocarbon feedstock, comprising steps of:

(a) optionally passing a process gas of hydrocarbon feedstock through a first reactor with a steam reforming catalyst heated by a hot gas stream;

(b) passing the effluent from the first reactor to a subsequent tubular reactor containing a steam reforming catalyst and being heated by burning of fuel, thereby obtaining a hot gas stream of steam reformed product gas and a hot gas stream of flue gas, wherein a reforming catalyst is placed on a metallic support having substantially the same shape as a wall of the reactor and being arranged in heat conduction relationship with the reactor wall.

In a specific embodiment of the invention, the reforming catalyst in the reactor in step b is provided both with a metallic support having substantially the same shape as a wall of the reactor and being arranged in heat conduction relationship with the reactor wall and as reforming catalyst pellets.

What is claimed is:

1. Process for the preparation of hydrogen and carbon monoxide rich gas by catalytic steam reforming of a hydrocarbon containing feedstock comprising the step of:

(a) passing a process gas of hydrocarbon feedstock through a tubular reactor with a steam reforming catalyst being heated by burning of fuel; wherein the steam reforming catalyst is adhered to a metallic support sheet formed into substantially the same shape as the wall of the reactor and being arranged in direct heat conduction relationship with the reactor wall.

2. Process of claim 1, further comprising the step of:

prior to step (a) passing a hydrocarbon feedstock through a first reactor with a steam reforming catalyst heated by a hot gas stream, forming a partly converted hydrocarbon feedstock;

wherein the steam reforming catalyst of the first reactor is adhered to a metallic support sheet formed into substantially the same shape as the wall of the reactor surrounding the catalyst and being arranged in direct heat conduction relationship with the reactor wall.

3. Process of claim 1 or 2, wherein the reforming catalyst in the reactor in step (a) is combined with reforming catalyst pellets.

4. Process of claim 2, wherein the steam reforming catalyst of the tubular reactor comprises nickel and/or noble metals.

5. Process of claim 2, wherein the steam reforming catalyst of the first reactor comprises nickel and/or noble metals.

6. Process for the preparation of hydrogen and carbon monoxide rich gas by catalytic steam reforming of a hydrocarbon containing feedstock comprising the steps of:

(a) passing a hydrocarbon feedstock through a first reactor with a steam reforming catalyst heated by a hot gas steam, forming a partly converted hydrocarbon feedstock;

wherein the steam reforming catalyst of the first reactor is adhered to a metallic support sheet formed into substantially the same shape as the wall of the reactor and being arranged in direct heat conduction relationship with the reactor wall; and (b) passing the partly converted hydrocarbon feedstock through a tubular reactor with a steam reforming catalyst in the form of pellets being heated by burning of fuel.

7. Process of any one of claims 1 and 6, wherein the steam reforming catalyst comprises nickel and/or noble metals.

* * * * *